No. 765,703. PATENTED JULY 26, 1904.
C. N. FRIZ.
FLY SCREEN.
APPLICATION FILED SEPT. 28, 1903.
NO MODEL.
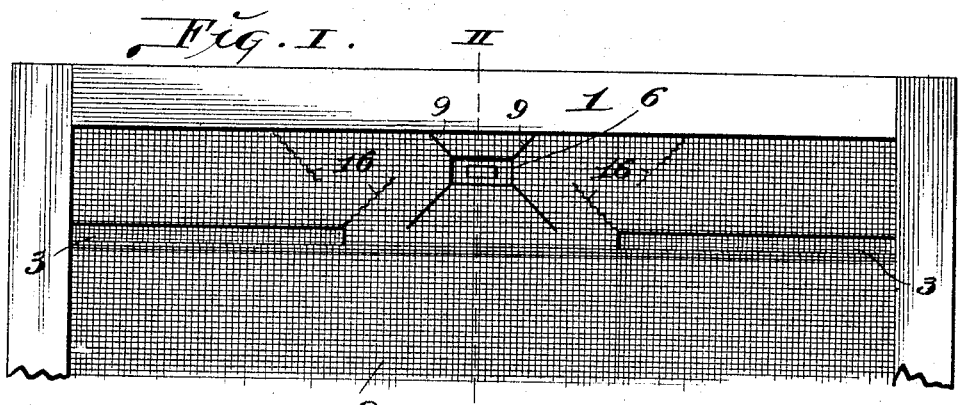
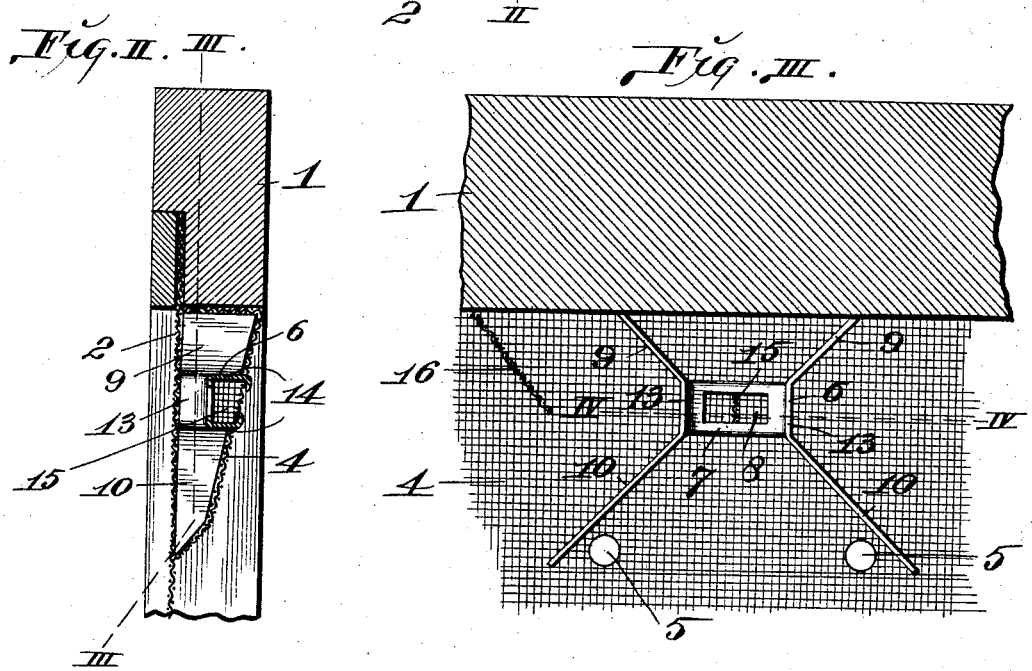
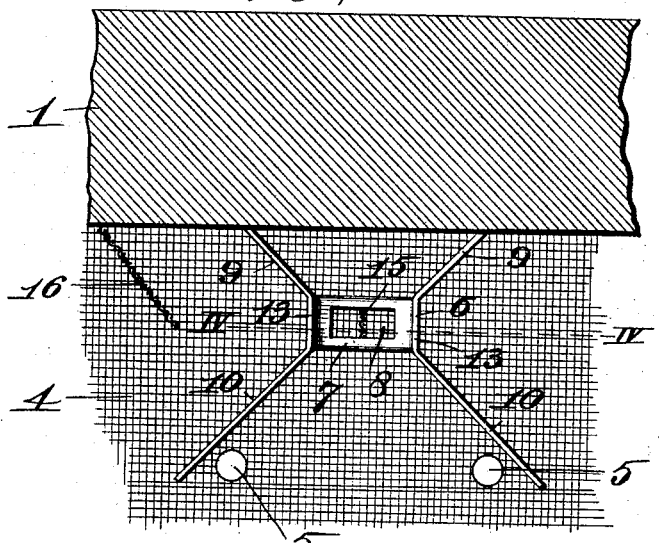
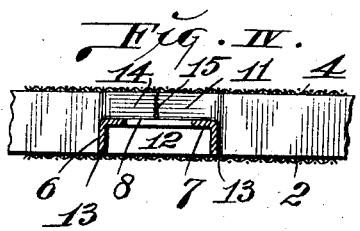
Attest:
M. F. Smith
Blanche Hogan.
Inventor:
C. N. Friz
By Wright Bros
Atty's.

No. 765,703. Patented July 26, 1904.

UNITED STATES PATENT OFFICE.

CLYDE N. FRIZ, OF BALTIMORE, MARYLAND.

FLY-SCREEN.

SPECIFICATION forming part of Letters Patent No. 765,703, dated July 26, 1904.

Application filed September 28, 1903. Serial No. 174,880. (No model.)

*To all whom it may concern:*

Be it known that I, CLYDE N. FRIZ, a citizen of the United States, residing in the city of Baltimore, in the State of Maryland, have invented certain new and useful Improvements in Fly-Screens, of which the following is a full, clear, and exact description, reference being had to the accompanying drawings, forming part of this specification.

My invention relates to a fly-screen for windows having embodied therein means for permitting the escape of flies or other insects from the interior of a room to the outer air without trapping the insects further than to prevent their return to the room after they have begun to make their egress through the screen.

My invention consists in features of novelty hereinafter fully described, and pointed out in the claims.

Figure I is an elevation of the upper part of a fly-screen constructed in accordance with my invention looking at the inner side thereof. Fig. II is an enlarged vertical section taken on line II II, Fig. I. Fig. III is a vertical section taken on irregular line III III, Fig. II. Fig. IV is a section on line IV IV, Fig. III.

1 designates the frame of my screen, which may be of any shape. To this frame is secured the main sheet 2, of netting, which extends from top to bottom of the frame. In the sheet of netting 2, near the upper end of the screen, are orifices 3, that may be in the form of horizontal slots, as shown in Fig. I, or may be in the shape of one or more apertures of any desired configuration.

4 is an exterior sheet of netting secured to the frame 1 and extending downwardly from the top of the frame at the outside of the screen to a point immediately beneath the orifices 3 in the main sheet of netting 2, as seen in Figs. II and III. This exterior sheet is provided with one or more openings 5 (see Fig. III) for the egress of an insect from the space between the sheets of netting 2 and 4, through which the insect may escape after passing into the space between said sheets of netting, as provided for by the orifices 3.

6 designates a partition-frame positioned between the sheets 2 and 4 of netting and through which the insects must pass to gain access to the exit-openings 5 for escape after they have entered the space between said sheets of netting. This partition-frame consists of a central member 7, provided with an orifice 8, upwardly-extending diverging arms 9, and downwardly-extending diverging arms 10. The arms 9 and 10 extend at angles from the ends of the central member of the partition-frame and provide funnel-shaped passageways, through which the insects pass to gain access into a space 11 at the rear of said central frame member, from which space they pass through the orifice 8 in the central frame member to gain access into the space 12 between said member and the inner netting sheet 2. The ends of the space 12 are inclosed by lips 13, that extend from the member to the inner netting sheet, as seen in Figs. II and IV. The space 11 is closed at top and bottom by outwardly-projecting lips 14, that lead from the central partition-frame member to the outer netting sheet 4, as seen in Figs. II and IV.

15 designates a partition extending vertically across the space 11 at the rear of the central partition-frame member 7, by which said space is divided centrally of the orifice 8 in the frame member 7 to separate the two ends of the space between the netting sheets 2 and 4. By the introduction of this partition the course of the insects from either end of the space between the netting sheets is stopped when the insects reach the orifice 8, and they thereby pass through said orifice to gain access to the space 12, which communicates with the space between the netting sheets and beyond by the lower arms 10 of the partition-frame 6, and within which the exit-openings 5 are located.

16 designates wings that partially obstruct the space between the netting sheets 2 and 4 and which are placed in inclined positions extending toward the location of the partition-frame in order that the insect will advance along the wings in the direction toward which they are presented, but will be retarded from returning in a direction away from said exit-opening by coming in contact with the wings, thereby preventing a retrograde course of the insect after the wings encountered have been passed.

The natural tendency of a fly or other insect is to crawl upwardly, and therefore when the insect alights on my screen it will in its effort to reach the outside air from the interior of the room having its window protected by the screen pass through the orifices 3 in the main sheet 2 of netting and into the space between the main and exterior netting sheets and thereafter instead of returning through the orifice by which it entered will continue its course through said space to the partition-frame 6 and pass therethrough in the course hereinbefore mentioned to reach the exit-openings 5, through which it may escape to the outside of the screen.

I claim as my invention—

1. In a fly-screen, the combination of an outer sheet of netting provided with an exit-opening, an inner sheet of netting separated from said outer sheet and provided with an entrance-orifice, and an apertured partition-frame having diverging wings between which the insect passes to reach said exit-opening, substantially as set forth.

2. In a fly-screen, the combination of an outer sheet of netting provided with an exit-opening, an inner sheet of netting provided with a pair of entrance-orifices and separated from said outer sheet to furnish a space between the sheets into which access may be obtained by the insect, and an apertured partition-frame having diverging wings dividing the space between said netting sheets, substantially as set forth.

3. In a fly-screen, the combination of an outer sheet of netting provided with an exit-opening, an inner sheet of netting separated from said outer sheet to provide a space between said sheets, and provided with an entrance-orifice, and a partition-frame in said space having arms inclosing said exit-opening, substantially as set forth.

4. In a fly-screen, the combination of an outer sheet of netting provided with an exit-opening, an inner sheet of netting separated from said outer sheet to furnish a space between said sheets and provided with an entrance-orifice, a partition-frame located in the space between said sheets having an orifice in the central member thereof and arms projecting from said central member, substantially as set forth.

5. In a fly-screen, the combination of an outer sheet of netting provided with an exit-opening, an inner sheet of netting separated from said outer sheet to furnish a space between said sheets and provided with an entrance-orifice, a partition-frame located in the space between said sheets having an orifice in the central member thereof and arms projecting from said central member, and a partition located at the orifice in said central member, substantially as and for the purpose set forth.

6. In a fly-screen, the combination of an outer sheet of netting provided with an exit-opening, an inner apertured sheet of netting separated from said outer sheet to furnish a space between said sheets, and wings in said space, substantially as and for the purpose set forth.

7. In a fly-screen, the combination of an outer sheet of netting provided with an exit-opening, an inner sheet of netting provided with an entrance-orifice and separated from said outer sheet to furnish a space between said sheets, a partition-frame in said space having diverging wings leading to said exit-opening and wings arranged in said space in inclined positions extending in the direction of said exit-opening, substantially as set forth.

CLYDE N. FRIZ.

In presence of—
FREDK. J. MESEKE,
GEORGE NORBURG MACKENZIE, 3d.